United States Patent
Howald et al.

(10) Patent No.: US 6,323,793 B1
(45) Date of Patent: Nov. 27, 2001

(54) HFC RETURN PATH SYSTEM USING DIGITAL CONVERSION AND TRANSPORT

(75) Inventors: Robert Landis Howald; Erik Christopher Metz, both of Chalfont; Timothy J. Brophy, Holland, all of PA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/556,731

(22) Filed: Apr. 21, 2000

Related U.S. Application Data

(60) Provisional application No. 60/130,685, filed on Apr. 23, 1999.

(51) Int. Cl.[7] ............................................. H03M 1/00
(52) U.S. Cl. ........................ 341/137; 455/426; 370/58.1
(58) Field of Search .................................. 341/137, 144, 341/155, 126; 370/241, 318, 395, 58.1; 455/426, 4.2

(56) References Cited

U.S. PATENT DOCUMENTS

| | | |
|---|---|---|
| 4,763,317 | 8/1988 | Lehman et al. ..................... 370/58 |
| 5,544,161 * | 8/1996 | Bigham et al. ..................... 370/58.1 |
| 5,644,622 | 7/1997 | Russell et al. ..................... 455/422 |
| 5,790,523 * | 8/1998 | Ritchie, Jr. et al. ............... 370/241 |
| 5,790,533 * | 8/1998 | Burke et al. ...................... 370/318 |
| 5,878,325 | 3/1999 | Dail ................................. 455/5.1 |
| 5,966,636 * | 10/1999 | Corrigan et al. ................... 455/4.2 |
| 6,041,056 * | 3/2000 | Bigham et al. ..................... 370/395 |
| 6,161,011 * | 12/2000 | Loveless ........................... 455/426 |

FOREIGN PATENT DOCUMENTS 0 318 331   5/1989   (EP) .

\* cited by examiner

*Primary Examiner*—Brian Young
*Assistant Examiner*—John Nguyen
(74) *Attorney, Agent, or Firm*—Mayer Fortkort & Williams, PC; Karin L. Williams, Esq.

(57) ABSTRACT

An HFC return path system uses digital conversion and transport at the fiber optic node, so as to replace analog laser technology with a high-speed baseband digital technology, thereby providing immunity from the troublesome analog laser impairments, enabling longer distances to be covered, potentially avoiding the need for hub repeater hardware required in analog systems, among other benefits.

8 Claims, 1 Drawing Sheet

HFC RETURN PATH SYSTEM USING DIGITAL CONVERSION AND TRANSPORT

STATEMENT OF RELATED APPLICATION

This application claims the benefit of priority under Title 35, USC 120, of co-pending US Provisional application, Ser. No. 60/130,685, filed Apr. 23, 1999.

FIELD OF THE INVENTION

The present invention relates generally to a cable television hybrid-fiber-coax (CATV HFC) return path system that uses digital conversion and transport. More particularly, the present invention describes a system that implements a digital transport method at the node, so as to replace analog laser technology with a high-speed baseband digital technology, thereby providing immunity from the troublesome analog laser impairments, enabling longer distances to be covered, and potentially avoiding the need for hub repeater hardware required in analog systems, among other benefits.

BACKGROUND OF THE INVENTION

Traditional HFC systems have implemented the return path, a 5–40 MHz bandpass in North America, using bi-directional RF amplifiers in the coaxial plant, and a linear return path laser in the fiber optic node, driving a return fiber for the optical trunking. At the hub or HE, the optical power is converted back to RF. The technology is the same analog AM-based optics approach used to transport the broadcast forward path video signals. There are numerous design and implementation issues that make this approach difficult and costly, including analog laser specifications, laser second order response characteristics, optical link length constraints, optical receiver specification, and testing of the components. All of these factors contribute to the overall cost issue of developing high performance analog optics. Node laser issues are exacerbated by the fact that this component must operate in an outdoor environment, specified over a very wide temperature range.

These problems have previously been addressed with continued development in improved analog lasers and return path receiver performance, higher power lasers and modification of HFC architectures. However, each of the above-noted issues are still presented.

The present invention is therefore directed to the problem of developing a return path system that lowers the cost of return path products and improves performance such that greater architectural flexibility can be achieved, resulting in, among other possibilities increased bandwidth and capacity, and faster connection speeds to subscribers.

SUMMARY OF THE INVENTION

The present invention implements a digital transport method at the point that the RF plant terminates and the optical trunk begins inside the node. To do this, analog laser technology is replaced by high-speed baseband digital technology. As a digital signal, immunity from the troublesome analog laser impairments is obtained and longer distances can be covered, potentially avoiding the need for hub repeater hardware required in analog systems, among other benefits.

There are many analytical and design issues associated with digitizing the return path at the node. It can be shown that an analog-to-digital (A/D) converter is a mathematical analogue to the AM modulated laser technology traditionally used. The A/D converter quantization noise can be treated as the effective "analog" optical link noise. This can be compared with the known performance capabilities of the lasers currently used. Additionally, the distortion performance, in particular the laser clipping aspect, is similar to the phenomenon of overdriving A/D input thresholds. The second order and third order distortions also can be kept very low in A/D's and, furthermore, the second order distortions do not degrade to poor values as analog lasers can. This can be an important issue in broadband applications. Ultimately, the strength of the digitizing technique is furthered by the functions and processing that can be applied once the information is represented completely as bits.

According to one embodiment of the present invention, a method for providing a digital return path in a hybrid fiber-coax cable television system using baseband serial optical transport, in which the return path signal from the fiber optic node to the headend is represented by encoding it entirely as ones and zeroes, includes the steps of (1) converting a composite return path waveform to a sequence of digital words whose value represent analog signal samples; (2) arranging said digital words into a serial stream with appropriate synchronization information to identify the boundaries between words and to recover timing of the bits themselves; (3) converting the electrical digital signal to an optical digital signal, and transmitting the optical ones and zeroes across an optical fiber; and (4) inverting steps (1)–(3) at the receive side.

Another embodiment of the invention is directed to a system for providing a digital return path in a hybrid fiber-coax cable television system using baseband serial optical transport, in which the return path signal from the fiber optic node to the headend is represented by encoding it entirely as ones and zeroes.

An aspect of one embodiment of the invention includes means for converting the sequence of digital words received at the headend to analog signal samples. Yet a further aspect of one embodiment of the invention includes means for providing the parallel digital words to a direct interface to an application's digital receiver.

BRIEF DESCRIPTION OF THE DRAWINGS

The above-mentioned and other objects, features and advantages of the present invention will become more apparent from the following detailed description when taken in conjunction with the accompanying drawing, wherein.

DETAILED DESCRIPTION

Figure 1:
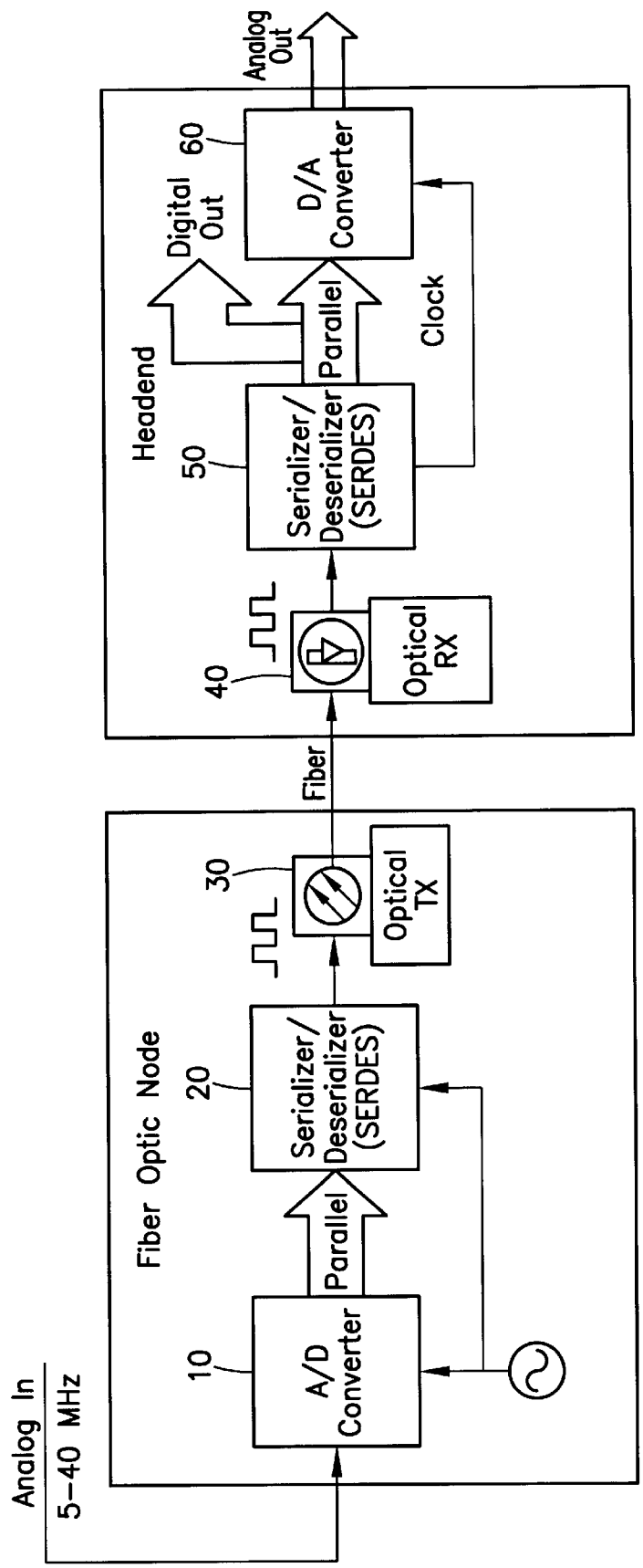
FIG. 1 depicts the basic elements of a digitized return path HFC architecture according to the present invention.

The basic elements of the proposed fiber optic node and headend of a digitized return path are shown in the simplified block diagram of FIG. 1. Essentially, the RF piece of the CATV plant in the reverse path terminates, and the optical trunk begins, at the fiber optic node. As such, this is a logical demarcation point to terminate RF signals.

Until relatively recently, the 35 MHz (North America) return path bandwidth required an RF solution, and thus employed analog laser technology for reverse transport— essentially the same technology used for broadcast analog video in the forward path. In such a system, the composite return path waveform AM modulates a laser, and the light intensity varies per the RF signal applied as the modulating signal.

The concept proposed herein transports this reverse path signal using baseband serial optical transport—representing the signal by encoding it entirely as ones and zeroes. As shown in FIG. 1, there are three main elements to this concept. They are 1) Converting the composite reverse path waveform to a sequence of digital words whose value represent analog signal samples.
2) Arranging the word into a serial stream with appropriate synchronization information to identify the boundaries between words and to recover timing of the bits themselves.
3) Converting the electrical digital signal to an optical digital signal, and transmitting the optical ones and zeroes across the fiber.
4) Inverting the process at the receive side A brief description of each of the technologies that enable this concept to be implemented follows.

Analog-to-Digital Conversion—10

Digitization of an analog signal for the purposes of allowing efficient transport between locations is an approach with strong roots in the telecommunications industry. In the well-documented case of voice telephony, however, the A/D conversion is done with a very low sampling rate. Voice bandwidths are on the order of 4 kHz, and the channel is baseband and switched in nature, so there is no aggregate build-up of analog traffic.

In an HFC reverse path, however, both of these simplifications are removed. The HFC return is a shared channel, so each user sharing a node consumes bandwidth, effectively aggregating the total possible consumed bandwidth upward with more users. And, rather than low frequency baseband, the HFC return is a 35 MHz wide bandpass.

These differences create the requirements for a significantly different A/D. Manufacturer's meeting of the requirements for higher performance, robust A/D components necessary for implementation on the HFC return path has come to pass relatively recently. Some key performance items are sampling rate (speed), high resolution, and environmental robustness.

As shown in FIG. 1, the composite analog return path waveform is received at the fiber optic node at A/D converter 10, which converts the composite reverse path waveform to a sequence of digital words whose value represent analog signal samples (accordingly, impairment after A/D conversion at the node is virtually eliminated). The output sequence of parallel digital words is then forwarded to serializer/deserializer (SERDES) 20.

Serializer-Deserializer (SERDES) IC's—20; 50

Major efforts in serial transport technology are currently developing in two arenas—Gigabit Ethernet and Fibre Channel. Powerful, new IC's can perform all of the essential serialization/deserialization functions necessary to implement a digital return from node to HE with complete transparency. Currently, Gbps data rates are available. The basic functions achieved are fourfold—parallel-to-serial conversion (and serial-to-parallel conversion), optical drive, timing and framing.

Parallel digital words are delivered to the SERDES chips 20 from the A/D 10 and must be made into a serial stream to transport over the optical link. Thus, the SERDES 20 (a serializer at the node) must latch in the information, multiply up the clock rate, and deliver the increased serialized rate to the optics. For a 10-bit device, the result is serial rates at about 1 Gbps. On the receive side, the inverse function is performed, and the output of the SERDES receiver chain (a deserializer 50 at the headend) is a digital word handed off to, for example, a D/A converter for analog signal reconstruction (of course, those skilled in the art will appreciate that the word may also be handed off in digital fashion to a direct interface to the application's digital receiver). The serial stream of digital words output from SERDES 20 is received by optical Tx 30.

With regard to the optical drive function, as the standards mentioned develop, compatible optics is also developing. Current technologies can often mix-and-match and be compatible, or very close to it, with just basic modifications, such as signal coupling, pull up/down, impedance transformation, etc. Part of the similarity rests solely on the fact that, at such high data rates, some form of emitter coupled logic (ECL) is unavoidable.

Continuing on to the timing function, it should be noted that the receive IC is delivered only one piece of information—a stream of bits. From this, it must achieve the timing to detect the bits (developing a synchronized clock to sample them at the optimal instant). Each side of the link plays a role in this. At the transmit side, the role is to encode the data such that there is guaranteed to be enough data transitions for the clock recovery circuit to acquire and hold. Thus, the optical transmitter TX 30 employs encoding that provides randomization to guarantee transitions in all situations. Without transitions, the clock frequency component necessary—embedded in the data sequence through the bit transitions—cannot be tracked effectively by the receive PLL. The role of the PLL is to re-generate this timing to yield effective serial sampling. Subsequent to bit timing, the word timing information—now divided down from the serial rate—is needed at the output for regeneration of the parallel word.

Finally, the framing function is addressed, for while it is obviously necessary to achieve bit timing, it is also necessary to know which sets of bits belong together as one analog sample. This is another problem with well-developed solutions in the networking world. Solutions center around sending known, predictable patterns signifying word boundaries that can be detected. For HFC, caveats exist. For example, the basic functions of the standards-based chips involves the movement of packets to and from the IC's from other digital sources. This allows, with minimal intrusion, transmission of demarcation characters to be sent between payload packets, particularly with the high sampling rates achievable creating many time slots. For HFC, however, some more intricate design functionality is necessary, as the A/D operation is delivering words constantly in real time to the SERDES function 20. Additionally, the word length used for accurate sample representation is not compatible with the transport protocols of the SERDES chipsets used. Thus, the serializer and deserializer functions also involve some word manipulation, implemented in programmable logic that interfaces with the SERDES, as an example, to format and unformat the words as necessary. Thus, in general, additional overhead must be inserted in more creative fashions for HFC applications Optical Transmitter—30/Optical Receiver—40

What completes the needed requirement set for high speed baseband digital optics with regard to HFC is modular, small, wide bandwidth modules, encompassing the data rate needed to capture the RF bandwidths elevated via sampling and serialization. Add field robustness, dropping costs of optics, and increased data rates on the short term horizon, and the units now become both relevant to current needs, and capable of expanding as the need for bandwidth grows.

As noted above, optical transmitter 30 receives a serial stream of digital words output from SERDES 20 and transmits the digital words to optical receiver 40. The implementation of an all bit stream at the RF-to-optical conversion point immediately brings into the equation the idea of standardized transport. For example, the use of SONET, SDH, or other standards-based transport simplifies network implementation, accelerates development, and brings with it a comfort level of a proven, robust technology into the HFC infrastructure. The fact that the digitization is pushed out to the node means that hub equipment can become common digital multiplexing equipment. In addition, because of the distance advantage, passive equipment or complete removal of hub repeater sites can be a possibility.

Finally, again referring to FIG. 1, D/A 60 reconstructs the waveform at the headend. However, it also introduces analog impairments—noise and distortion. The D/A output is typically amplified and split and then delivered to an application receiver. The receiver often immediately digitizes the signal and performs the receive, synchronize and demodulation functions in an all-digital receiver. Of course, as noted above, the word may also be handed off in digital fashion to a direct interface to the application's digital receiver.

The list of potential short term benefits of the proposed digitized return path are apparent: optical costs, total equipment costs, link distance, distortion performance, component specification, test simplicity. However, perhaps the most benefit is in the years to come, as the conversion of the return path to all bits opens up many networking possibilities associated with processing, transport, multiplexing, and terminating equipment interfaces.

Although various embodiments are specifically illustrated and described herein, it will be appreciated that modifications and variations of the present invention are covered by the above teachings and within the purview of the appended claims without departing from the spirit and scope of the invention.

What is claimed is:

1. A method for providing a digital return path in a hybrid fiber-coax cable television system using baseband serial optical transport, in which the return path signal from the fiber optic node to the headend is represented by encoding it entirely as ones and zeroes, comprising the steps of:

converting, at the fiber optic node a composite return path waveform to a sequence of digital words whose value represent analog signal samples;

arranging, at the fiber optic node, said digital words into a serial stream with appropriate synchronization information to identify the boundaries between words and to recover timing of the bits themselves;

converting, at the fiber optic node, the electrical digital signal to an optical digital signal, and transmitting the optical ones and zeroes across an optical fiber to the headend; and inverting the foregoing steps at the headend.

2. A system for providing a digital return path in a hybrid fiber-coax cable television system using baseband serial optical transport, in which the return path signal from the fiber optic node to the headend is represented by encoding it entirely as ones and zeroes, the fiber optic node comprising:

conversion means for converting a composite return path waveform to a sequence of digital words whose value represent analog signal samples;

means for arranging said digital words into a serial stream with appropriate synchronization information to identify the boundaries between words and to recover timing of the bits themselves;

conversion/transmission means for converting the electrical digital signal to an optical digital signal, and transmitting the optical ones and zeroes across an optical fiber.

3. A system according to claim 2, the headend comprising:

conversion/receiver means for receiving the optical ones and zeroes from the optical fiber and converting the optical digital signal to an electrical digital signal; and means for deserializing the serial stream of digital words and synchronization information.

4. A system according to claim 3, further comprising conversion means for converting the sequence of digital words to analog signal samples.

5. A system according to claim 3, further comprising means for providing the parallel digital words to a direct interface to an application's digital receiver.

6. A system for providing a digital return path in a hybrid fiber-coax cable television system using baseband serial optical transport, in which the return path signal from the fiber optic node to the headend is represented by encoding it entirely as ones and zeroes, the fiber optic node comprising:

an A/D converter for converting a composite return path waveform to a sequence of digital words whose value represent analog signal samples;

a SERDES for arranging said digital words into a serial stream with appropriate synchronization information to identify the boundaries between words and to recover timing of the bits themselves; and an optical transmitter for converting the electrical digital signal to an optical digital signal, and transmitting the optical ones and zeroes across an optical fiber, the headend comprising:

an optical receiver for receiving the optical ones and zeroes from the optical fiber and converting the optical digital signal to an electrical digital signal; and a SERDES for deserializing the serial stream of digital words and synchronization information.

7. The system according to claim 6, further comprising an A/D converter for converting the sequence of digital words to analog signal samples.

8. The system according to claim 6, further comprising means for providing the parallel digital words to a direct interface to an application's digital receiver.

* * * * *

UNITED STATES PATENT AND TRADEMARK OFFICE
CERTIFICATE OF CORRECTION

PATENT NO.    : 6,323,793 B1
DATED         : November 27, 2001
INVENTOR(S)   : Robert Landis Howald et al.

It is certified that error appears in the above-identified patent and that said Letters Patent is hereby corrected as shown below:

Column 2,
Line 6, change "AID" to -- A/D --.

Column 3,
Line 7, change "word" to -- words --.
Line 14, after "side", insert a period -- . --.
Line 18, change "purposes" to -- purpose --.

Column 4,
Line 4, change "Tx" to -- TX --.
Line 26, change "re-generate" to -- regenerate --.
Line 54, after "applications", insert a period -- . --.

Signed and Sealed this

Sixteenth Day of April, 2002

Attest:

JAMES E. ROGAN
*Attesting Officer*    *Director of the United States Patent and Trademark Office*

Adverse Decision in Interference

Patent No. 6,323,793, Robert Landis Howald, Erik Christopher Metz, Timothy J. Brophy, HFC RETURN PATH SYSTEM USING DIGITAL CONVERSION AND TRANSPORT, Interference No. 105,515, final judgment adverse to the patentees rendered June 1, 2007, as to claims 1-8.

*(Official Gazette October 23, 2007)*